United States Patent [19]

Grey

[11] 4,023,504
[45] May 17, 1977

[54] FLATBED CAR CONTAINER SEWING DEVICE

[76] Inventor: Vincent G. Grey, 607 Randolph St., Falls Church, Va. 22046

[22] Filed: Mar. 29, 1976

[21] Appl. No.: 671,075

[52] U.S. Cl. .................... 105/366 B; 105/366 A; 296/35 A
[51] Int. Cl.² ............... B60P 7/08; B61D 17/00; B61D 49/00; B65J 1/22
[58] Field of Search ....... 105/366 A, 366 B, 366 C, 105/366 D, 366 E, 366 R; 296/35 A

[56] References Cited

UNITED STATES PATENTS

| 3,144,838 | 8/1964 | Shaver et al. | 105/366 A |
|---|---|---|---|
| 3,521,845 | 7/1970 | Sweda et al. | 105/366 B X |
| 3,717,373 | 2/1973 | Carr | 105/366 R X |
| 3,894,493 | 7/1975 | Strecker | 105/366 B |

Primary Examiner—Robert J. Spar
Assistant Examiner—Howard Beltran
Attorney, Agent, or Firm—Darbo, Robertson & Vandenburgh

[57] ABSTRACT

The locking apparatus on a flatbed vehicle, etc., for engaging the corner fitting on a container carried thereby includes a shank with a crosshead which is moved into the corner fitting and is rotated 90° to engage the locking device. The shank has an annular rack thereon. A gear segment engages this rack and is rotated manually to push the rack one way or the other to establish the desired axial position of the shank. On the distal end of the shank is a gear which engages a gear on a rotatable locking member. The locking member has teeth which engage the teeth of the rack to prevent axial movement of the rack and shank when the crosshead on the shank is in the locked position in the container corner fitting. The locking member is rotatable to move its teeth away from the rack and that rotation correspondingly rotates the shank. Ultimately that rotation results in the crosshead on the shank being aligned with the opening in the container corner fitting, whereupon the shank can be moved axially to commence the withdrawal of the crosshead from the corner fitting.

10 Claims, 4 Drawing Figures

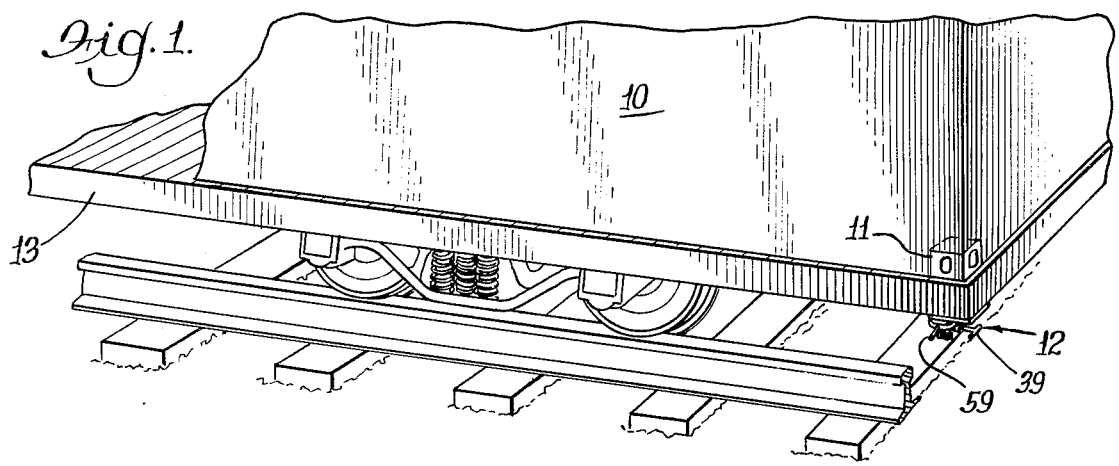
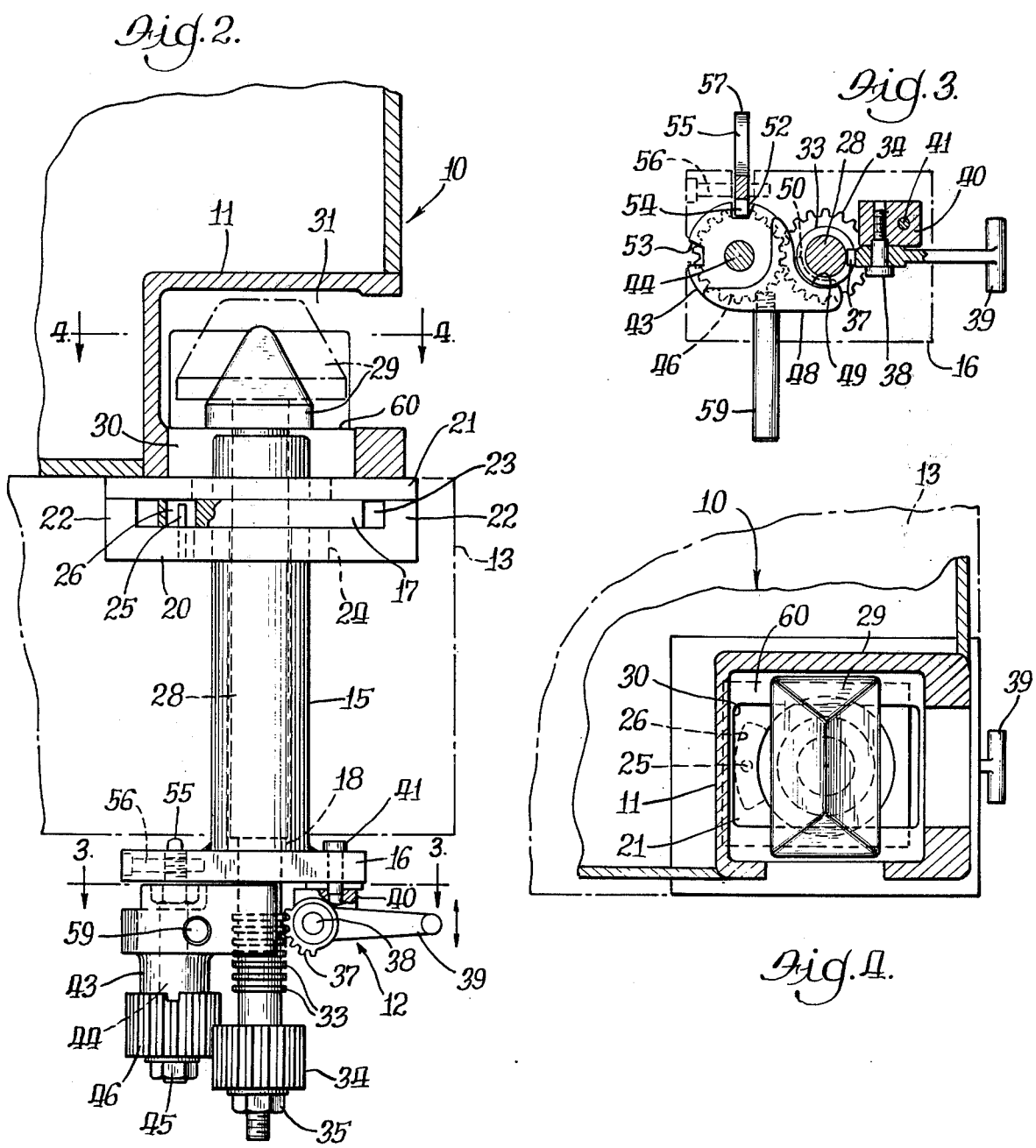

FLATBED CAR CONTAINER SEWING DEVICE

BACKGROUND AND SUMMARY OF THE INVENTION

In the shipping; industry a standard corner fitting has been established for shipping containers. Such corner fittings on the bottom of the containers will provide locations at which the container may be engaged by appropriate apparatus to secure the container on a transportation vehicle, e.g., truck, railroad car or ship. Such corner fittings on the tops of the containers are employed, for example, as a location to engage the container by an overhead crane for moving the container from one such vehicle to another, or for securing two vertically stacked containers together. A typical form of the apparatus used to engage the corner fitting comprises a shank axially and rotatably movable in the frame of the locking apparatus. At one end the shank has a crosshead proportioned to enter the oblong hole in the corner fitting when in one azimuthal orientation and rotatable ninety degrees to an orientation at which the crosshead is transverse that oblong opening whereby the corner fitting is then locked to the apparatus frame. The prior art has proposed and utilized various types of devices for axially and rotationally moving the shank and for locking the shank against those movements when the crosshead is positioned transverse the oblong opening in the container corner fitting. The present invention is primarily directed to a novel form of such device for controlling the rotational and axial positions of the shank of a locking apparatus.

Several standard forms of such locking mechanisms presently in use operate on the principle of a cam or a toggle joint. Thus they provide for axial positioning of the shank within a relatively limited range when the crosshead is being locked into the corner fitting. This is adequate so long as conditions are at the optimum for which the locking apparatus was designed. In actual use, however, the conditions are often not at the designed optimum resulting in difficulty in utilizing the locking apparatus embodying such operating mechanisms. For example, the bed of a trailer or a flatcar having such locking apparatus will become warped between the locations of the individual locking units so that the spaced units are no longer in a common plane. This can require an additional axial movement of the shank of one locking unit to adequately penetrate the respective corner fitting. Another common occurrence will be that the bed will have a high spot between the spaced units which high spot holds the container at an elevation above the plane of the units thereby requiring additional axial movement of the shank of at least one of the units in order to adequately penetrate the respective corner fitting. The container may become twisted so that one (or more) of the four corner fittings at the bottom of the container no longer lies in the plane of the other three.

The principal object of the present invention is to provide a locking mechanism wherein the shank of the locking device is effective within a greater range of axial movement than is the case with such devices commonly in use today. At the same time, the container may be securely engaged and held by the crosshead at any loction within the range of the axial movement of the shank. When the container is so engaged by the crosshead, the operating mechanism can be securely locked against accidental displacement which might result in a loosening of the engagement of the apparatus with the container corner fitting.

The operating mechanism is complete in itself; that is, no separate tools or the like are employed and thus the possibility of not having the tools available or their becoming lost is avoided.

The present invention also embodies a feature permitting the shank and crosshead of the locking device to be shifted in a plane transverse to the axis of the shank to thereby accommodate misalignments that may be present due to damage of the container or of the vehicle which is to receive the container.

In the present invention there is an annular rack adjacent the distal end of the shank of the locking device. This rack is engaged by a manually rotatable gear segment to move the shank axially. It is also engageable by the teeth of a locking member to prevent axial movement of the shank when the crosshead is in the locked position in the container corner fitting. Gears on the locking member and on the shank cause the two to rotate in unison and to permit the locking member to be used to rotate the crosshead to the position at which it is aligned with the opening in the container corner fitting, the initial part of that movement of the locking member resulting in an unlocking of the axial position of the shank.

Further objects and advantages will become apparent from the following description taken in conjunction with the drawing.

DESCRIPTION OF THE DRAWING

FIG. 1 is a fragmentary isometric view of a railroad car embodying a locking apparatus of the present invention to secure a shipping container to the car;

FIG. 2 is an elevational view of the embodiment incorporated in FIG. 1 and showing its use with the corner fitting of a shipping container illustrated in section;

FIG. 3 is a section viewed at line 3—3 of FIG. 2; and

FIG. 4 is a section viewed at line 4—4 of FIG. 2.

DESCRIPTION OF SPECIFIC EMBODIMENT

The following disclosure is offered for public disseminatin in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

For the purposes of illustration, FIG. 1 shows a container, generally 10, mounted on the bed of a railroad flat car. The container has corner fittings 11. These could be at all eight corners or only at the bottom four corners. The railroad car has a container locking apparatus, generally 12, associated with each of the bottom four corner fittings. These are secured to the main frame 13 of the car. Were these fittings to be used as a part of the bed of a truck or truck trailer, they would be secured to the main frame of that vehicle. Similarly, they could be used on the spreader (main frame) of a lifting apparatus used in conjunction with an overhead crane. Were they to be used on the deck of a vessel, that would be considered to be the "main frame" for the purposes of the description herein.

The container locking apparatus includes a subframe comprising a sleeve 15, a plate 16 welded to one end of the sleeve and a plate 17 adjacent the other end of the sleeve and welded thereto. The two plates 16 and 17 are normal to the axis of the sleeve. The sleeve has an axial opening 18.

Plates 20 and 21 form a part of the main frame 13 and, along with sides 22, define a pocket 23 in which plate 17 is received. Plate 17 normally rides on plate 20 and supports the container locking apparatus 12 from the main frame 13. The horizontal dimensions of pocket 23 are larger than the corresponding dimensions of plate 17 thereby permitting the plate to shift horizontally in the pocket. Plate 20 has an opening 24 through which sleeve 15 extends. This opening is substantially larger than the external diameter of the sleeve to thereby permit that horizontal shifting. Plate 17 is annular so that it also can be rotated in the pocket 23. A pin 25 secured to plate 20 projects into a curved slot 26 in plate 17 to thereby limit the rotational movement of the plate 17 in pocket 23.

A shank 28 is journaled in sleeve 15. At one end the shank has a crosshead 29. The distal end of the crosshead has the configuration of a hipped roof, relatively long in one direction and relatively narrow in the other. The dimensions in these directions are just smaller than the corresponding dimensions of opening 30 which extends through the bottom wall of the corner fitting 11. Thus when the crosshead is aligned with opening 30 (i.e. rotated 90° about the axis of shank 28 from the position illustrated in FIG. 4) the crosshead can be moved through the opening 30. However, when the crosshead 29 is in pocket 31 of the fitting 11 and transverse to opening 30 as illustrated in FIG. 4, the crosshead is trapped in the corner fitting.

Adjacent the other end of the shank 28, the distal end, are a plurality of annular teeth 33 which form an annular rack. Yet closer to the distal end of the shank is a spur gear 34. This gear is keyed to the shank and held on by a nut 35 threaded onto the distal end of the shank.

A spur gear segment 37 is journaled on a stud 38 with the spur gear teeth engaging the teeth 33 of the shank rack. The spur gear segment has a handle 39 integral therewith and extending outwardly to enable the gear segment to be rotated about stud 38. Stud 38 is threaded into a mounting block 40. Mounting block 40 is suitably secured to plate 16, as by means of bolt 41. Thus the gear segment and handle form a pivoted actuating lever to engage the rack and move the shank axially.

A locking member includes a sleeve 43 journaled on a stub shaft 44. The stub shaft is threaded into plate 16 and has a nut 45 threaded onto its distal end to hold the sleeve in place. This nut also holds a spur gear 46, keyed to sleeve 43, onto the sleeve. Spur gear 46 engages spur gear 34.

Sleeve 43 has a projection 48 with a concave face 49 of a curvature to fit around teeth 33 of the annular rack. Locking teeth 50 project from face 49 and are dimensioned and spaced to fit in the grooves between teeth 33 of the rack.

About the periphery of the sleeve 43 are a pair of slots 52 and 53 aligned parallel to the stub shaft 44. The slots are of a size to receive the nose 54 of a latch 55. An upper part of latch 55 is journaled on bolt 56 threaded into plate 16. The latch hangs downwardly from bolt 56 with its weight holding nose 54 in one of slots 52, 53. When the outer end 57 of the latch is manually raised and the latch thereby pivoted about bolt 56, the nose 54 moves out of the slot.

As illustrated in the drawings, the locking apparatus 12 is engaged in the corner fitting 11 to secure that corner of the container 10 to the main frame 13. The shank 28 cannot be accidentally rotated, such as might permit the crosshead 29 to become aligned with opening 30 in the corner fitting, since the latch 55 rotationally locks sleeve 43. The locking of sleeve 43 prevents, through gears 46, 34, the rotation of shank 28. Furthermore, the teeth 50 of locking sleeve 43 are engaged with teeth 33 on the shank which thereby prevents axial movement of the shank 28.

To release the container from the illustrated locked position, a person would raise the outer end 57 of latch 55 to thereby remove nose 54 from the slot 52. Then by grasping handle 59 the locking sleeve 43 would be rotated in a clockwise direction, as viewed in FIG. 3. A downward pressure on handle 39 while this rotation was taking place would aid in freeing crosshead 29 from frictional contact with the bottom wall 60 of the container corner fitting. During the initial few degrees of that rotation the teeth 50 are withdrawn from between teeth 33 thereby freeing the shank 28 for axial movement. Through the gears 46, 34, the rotation of the locking sleeve 43 rotates crosshead 29. After the two have been rotated ninety degrees, the crosshead is aligned with opening 30 as shown in dot dash lines in FIG. 2. Also at that time, the slot 53 on the locking sleeve is aligned with latch 55. By latching the locking sleeve and thus the crosshead 29 in the rotated positions, the operator is sure that the crosshead 29 remains aligned with opening 30 throughout the process of removing the container 10 and replacing it with another container. When the crosshead 29 is so aligned with opening 30 and the pressure on handle 39 released, the crosshead and shank are free to drop down. The limit of that downward movement is determined by the crosshead coming to rest upon the top of frame sleeve 15. It is then at least partially within opening 30. This eliminates the possibility of unintentional hangups as container 10 is lifted upwardly to remove it from the vehicle.

Of course, the crosshead then remains locked in that position when a corner fitting of another container is being placed thereover. Thereafter a person moves handle 39 downwardly, thereby raising crosshead 29 into the pocket 31 of the corner fitting. With latch 55 disengaged from the locking sleeve, the locking sleeve is rotated (counterclockwise in FIG. 3) to return the locking apparatus to the position illustrated in the drawing. During the final part of that movement the downward pressure on handle 39 is released so that the bottom of the crosshead bears against the top of wall 60. In some instances it may even be desirable during that final movement to pull upwardly on handle 39 thereby causing a downward pressure of the crosshead 29 against wall 60.

It will be noted that in the disclosed embodiment, the shank 28 only rotates ninety degreees between its two end positions. Thus the rack defined by teeth 33 need only be a quadrant of an annulus. However, since it would be normally manufactured by a lathe, there is nothing then to be gained by eliminating the unused three-quarters. If wear occurred, it would be possible to rotate it one hundred eighty degrees to a fresh side. With another form of manufacturing operation, perhaps only a quadrant could be made more economically. Also, in some embodiments the operative range might be extended beyond a quadrant.

I claim:

1. In an apparatus for engaging a fitting on a container which fitting defines an internal pocket and an oblong opening extending from the pocket through a fitting wall to a side of the fitting, said apparatus comprising a frame, a locking device having an axial shank and an oblong crosshead of a size to move through said opening when aligned therewith and to engage said wall when positioned transverse to said opening, said shank being journaled in said frame for axial and rotational movements, means engaging said shank for rotating said locking device and for selectively permitting and selectively preventing said locking device moving in the direction such that the crosshead is moving away from said frame, the improvement comprising:

said means including a rack extending axially along said shank, said rack being a quadrant of an annulus having its axis coincident with the shank axis, and an actuating lever having an end in the form of a segment of a gear about a second axis, said end being in engagement with said rack, said lever being secured to said frame for rotation about said second axis which is normal to said shank axis, said actuating lever including means for rotating it about said second axis thereby moving said shank axially.

2. In an apparatus as set forth in claim 1, wherein said rack is a full annulus whereby said gear segment will engage said rack in any rotational position of said shank.

3. In an apparatus as set forth in claim 1 wherein said means engaging said shank includes a member positioned to a side of said shank and adjacent said rack, means for connecting said member to said shank and including a tooth positioned to engage said rack, and means connecting said member and said frame to hold said member against such movement as would permit the shank to move axial when said tooth is in engagement with said rack and to permit said member to be moved to a second position at which said tooth is spaced from said rack to thereby permit axial movement of said shank.

4. In an apparatus as set forth in claim 3, wherein the last mentioned means permits the member to be rotated about an axis parallel to said shank axis, and including means interconnecting said member and said shank for common rotation and positioning said crosshead transverse to said opening when said tooth is in engagement with said rack and said tooth out of engagement with said rack when said crosshead is in alignment with said opening.

5. In an apparatus as set forth in claim 4, wherein the connecting means comprise two interengaging gears, one on the shank and one on the member, and wherein said tooth is one of a plurality of teeth positioned to correspond to the spacing of the rack teeth, each of said plurality of teeth being curved to conform to the curvature of said rack about the shank axis.

6. In an apparatus as set forth in claim 5 and used as a component of a container holding device having a main frame, the further improvement comprising:

means mounting said apparatus frame in said main frame for limited movement normal to the shank axis.

7. In an apparatus as set forth in claim 6, wherein the last mentioned means comprises:

a first plate secured to said apparatus frame and positioned normal to the shank axis, said plate having one side facing said crosshead and a second side facing away from said crosshead;

a second plate secured to said main frame and positioned normal to the shank axis, said second side having a face in contact with said second side and having an opening through which the shank and part of the apparatus frame extends; and means secured to said main frame and contacting said one side of said first plate to restrict the movement of the first plate away from the second plate.

8. In an apparatus as set forth in claim 1 and used as a component of a container holding device having a main frame, the further improvement comprising:

means mounting said apparatus frame in said main frame for limited movement normal to the shank axis.

9. In an apparatus as set forth in claim 8, wherein said limited movement is provided in all directions in a plane, including rotational.

10. In an apparatus as set forth in claim 8, wherein the last mentioned means comprises:

a first plate secured to said apparatus frame and positioned normal to the shank axis, said plate having one side facing said crosshead and a second side facing away from said crosshead;

a second plate secured to said main frame and positioned normal to the shank axis, said second side having a face in contact with said second side and having an opening through which the shank and part of the apparatus frame extends; and means secured to said main frame and contacting said one side of said first plate to restrict the movement of the first plate away from the second plate.

* * * * *

UNITED STATES PATENT AND TRADEMARK OFFICE
CERTIFICATE OF CORRECTION

PATENT NO. : 4,023,504

DATED : May 17, 1977

INVENTOR(S) :

It is certified that error appears in the above-identified patent and that said Letters Patent are hereby corrected as shown below:

```
In the title, "SEWING" should read --SECURING--.
Column 1, in the title, "SEWING" should read --SECURING--.
Column 1, line 6, the semicolon should be deleted after
"shipping".
```

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*